Patented Aug. 9, 1949

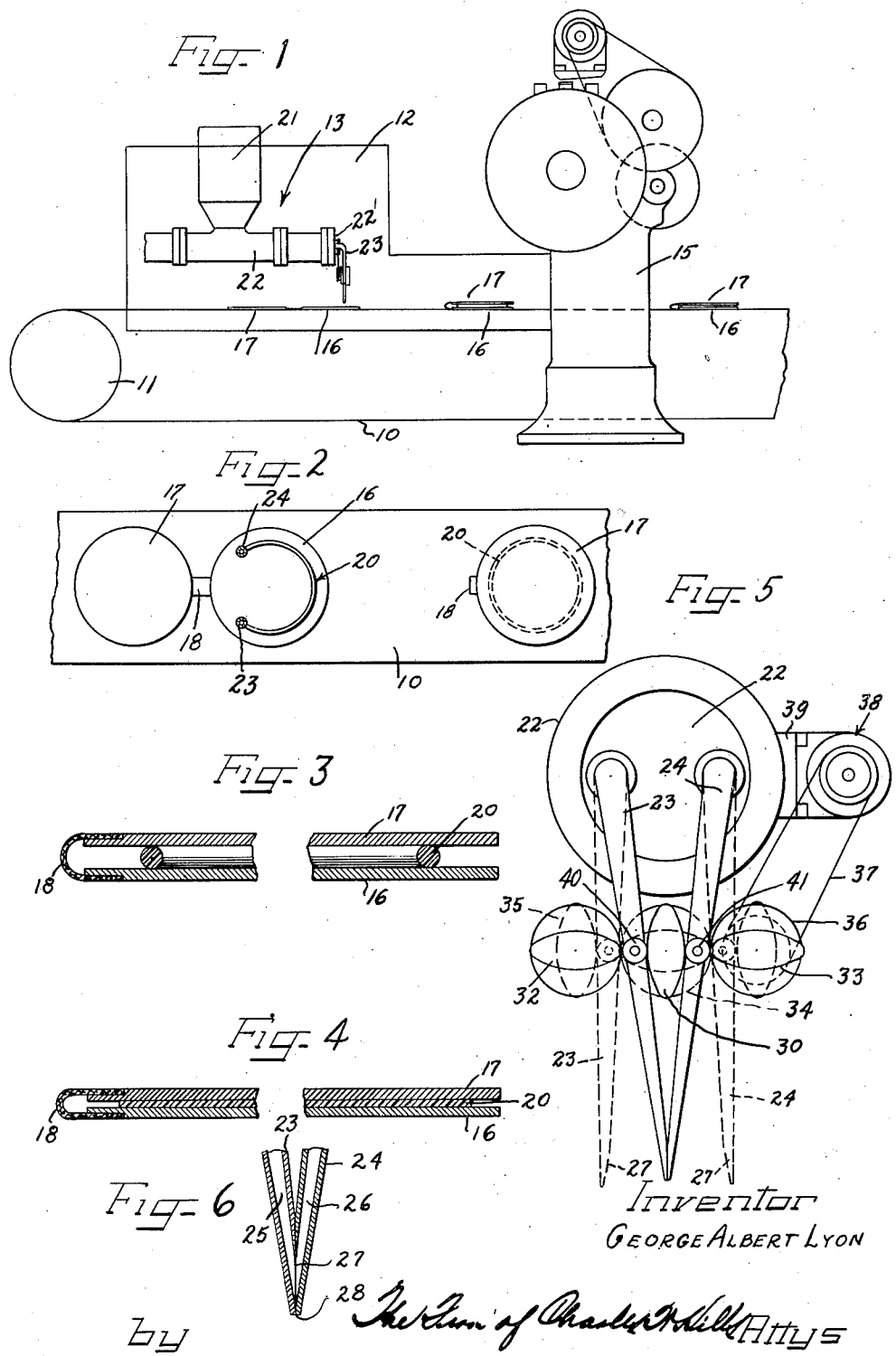

2,478,199

UNITED STATES PATENT OFFICE 2,478,199

METHOD AND APPARATUS FOR FORMING PLASTIC ARTICLES

George Albert Lyon, Allenhurst, N. J.

Application April 1, 1946, Serial No. 658,711

15 Claims. (Cl. 18—12)

This invention relates to a method of and apparatus for forming plastic and more particularly to a method of and apparatus for forming thermoplastic extruded stock into flattened plastic of predetermined ring-like pattern.

In the past, it has been the practice to make plastic sheeting in a number of different ways. One of these methods of making plastic comprises calendering the plastic by suitable rolls. Another way comprises flowing the plastic on polished plates or drums and allowing it to subsequently solidify.

The calendering method is not very satisfactory for the reason that due to the tacky nature of the material, it tends to adhere to the calendering rolls and as a consequence does not have a smooth surface.

The other or flowing method of making plastic sheet does enable a highly polished sheet, but due to the time factor, this method is too expensive, especially where it is desired to substitute plastic for steel on a large production scale.

It is an aim therefore of this invention to provide a new method of and apparatus for making sheet-like plastic articles which is sufficiently economical that the plastic can be substituted for steel sheet in a given article without adding to the cost of the article.

Yet another object of this invention is to provide a method of and apparatus for delivering thermoplastic stock in such manner that as the stock is advanced it can be laid down in ring-like pattern on a given support where it can be subsequently flattened.

In accordance with the general features of this invention there is provided in a method of forming plastic rings, the steps of discharging streams of plastic toward a given support, advancing the support under said streams, and moving said streams apart and toward each other transversely of the direction of the advance of said support so that the plastic streams together are deposited in a ring-like pattern on the support.

Other features of the invention relate to the provision of an apparatus for forming thermoplastic rings wherein a plastic extruder has a plurality of relatively swingable extruding nozzles movable toward and from each other transversely over a conveyor and wherein a support in a heated chamber receives the plastic on the conveyor, the nozzles depositing the plastic on the support in a ring-like pattern.

Still other features of the invention relate to the pressing of the deposited ring while it is still hot so that the ensuing ring is of polished sheet-like form.

Yet other features of the invention relate to the construction of the nozzles so that when they do converge they will lap each other in such a manner as to cut off the flow of plastic to the support.

A further feature of the invention relates to the construction of the support for the extruded plastic out of hinged polished plates adapted to be opened when the plastic is being deposited and adapted to be moved together for a subsequent press operation to flatten the deposited ring of plastic.

Other objects and features of this invention will more fully appear from the following detailed description taken in connection with the accompanying drawing, which illustrates a single embodiment thereof and in which Figure 1 is a diagrammatic view illustrating an apparatus for practicing my novel method of forming flattened plastic rings;

Figure 2 is a fragmentary plan view of the conveyor showing the plastic supporting plates thereon;

Figure 3 is a cross-sectional view taken through the hinged plates and showing a plastic ring between them preparatory to the pressing operation;

Figure 4 is a cross-sectional view similar to Figure 3 but showing the plastic in a flattened condition;

Figure 5 is an end view of the extruder head showing the swivelly mounted cooperable nozzles and showing somewhat diagrammatically a cam mechanism for moving the nozzles to and from each other; and Figure 6 is a fragmentary cross sectional view through the discharge ends of the nozzles showing how they are cut on a bias and showing how they come together to close off the flow of plastic.

As shown on the drawing:

The reference character 10 designates generally an endless conveyor which may be made of any suitable sheet material although I preferably make it of polished stainless steel sheet. The ends of this belt are adapted to be trained in the usual way over driving drums 11, one of which is shown in Figure 1.

The upper leg of the belt 10 passes through a heating chamber 12, which envelops most of a plastic extruder 13 and extends clear up to a conventional punch press 15 between the platens of which the deposited plastic is adapted to be flattened as shall be described more fully hereinafter.

Any suitable means may be employed for driving the conveyor belt 10, such as is commonly used in the conveyor art. The upper leg of the belt is moved longitudinally in a direction from left to right as shown in Figure 1. The belt is adapted to carry plate-like supports on which plastic is deposited from the extruder 13. These plate-like supports each comprise two highly polished thin stainless steel plates 16 and 17 suitably hinged together by a flexible hinge 18. A series of these hinged plates is placed on the conveyor 10 so as to be delivered into the heating chamber 12 in consecutive order with the plates opened up as shown at the left of Figure 2.

After the plastic has been deposited on the plates in the form of a ring 20, the plate 17 may be turned back on top of the plastic as shown at the right hand ends of Figures 1 and 2. Access may be had to the plates for this purpose through a suitable door opening (not shown) in advance of the press 15.

The extruder 13 may be made of any suitable or conventional construction with the exception of its discharge end. It includes a hopper 21 for charging the extruder with thermoplastic material. This hopper 21 may extend out of the heating chamber 12 so as to be accessible from the exterior of the chamber. It is adapted to be charged with a thermoplastic material, such, for example, as ethyl cellulose, cellulose acetate, vinyl resins or the like.

The main body 22 of the extruder terminates in a discharge head or end 22' which swivelly carries two swingable tubular nozzles 23—24 (Figure 5). Any suitable means may be employed for heating the plastic in the extruder, as is well known in the art. The screw of the extruder advances the plastic material forward toward the nozzles 23—24 which as mentioned before are swivelly journaled in the discharge end of the extruder.

Each of these nozzles 23—24 is formed hollow, as shown in Figure 6, or in other words, is provided with a tubular passage-way 25—26. The discharge ends of the passage-ways 25—26 are cut on a bias at 27 so that the tip-like ends of the nozzles can come together when the nozzles are moved toward each other for the purpose of cutting off any further flow of plastic. In Figure 6 it will be perceived that when the ends 28 are together the passage-ways 25—26 are lapped thus substantially discontinuing any further flow of plastic from the nozzles. Any suitable means may be employed for reciprocating nozzles 23 and 24 toward and from each other. I have illustrated such a means in the form of three cams 30, 32 and 33. The cams 32 and 33 are disposed at right angles to the cam 30. Meshing gears 34, 35 and 36, illustrated diagrammatically in Figure 5, may be employed for rotating the cams. This gearing can be driven by a suitable belt drive 37, which, in turn, can be driven by a prime mover 38 supported on a bracket 39 from the extruder body 22.

The cams 30, 32 and 33 are adapted to strike and bear against rollers 40 and 41 carried by the two nozzles 23 and 24.

When the cams 30, 32 and 33 are in the full line positions shown in Figure 5, the nozzles 23 and 24 will be together. On the other hand when the cams 30, 32 and 33 are rotated to positions at right angles to the full line positions and as shown by dotted lines, the nozzles 23 and 24 will be moved to their outermost positions.

Now, it will be appreciated that during this movement of the nozzles 23 and 24 from the full line to the dotted line positions the upper leg of the conveyor 10 is likewise moving forward at a predetermined rate. This results in the plastic discharged from the nozzle, as shown in Figure 2, being deposited in ring-like form 20 upon the plate 16. It follows that with a complete oscillation of the nozzles from closed to open and back to closed position a complete annulus 20 of plastic will be deposited on the plate or support 16.

Any conventional stop-and-go switch mechanism may be employed for controlling the forward movement of the belt and the operation of the extruder 13.

After a complete annulus 20 of plastic has been deposited on a lower plate 16 the conveyor belt advances the plates 16 and 17 toward the press 15 and during the course of this advance the plate 17 can be swung over and on top of the lower plate, as shown in Figures 1 and 2.

Thereafter when the two plates 16 and 17, with the plastic therebetween enters the press 15, on the conveyor belt, the platens of the press come together to squeeze the ring 20 from the round form shown in Figure 3 to the flattened sheet form shown in Figure 4. After the plates 16 have passed out of the press 15, the plastic is allowed to cool and to take a set and then the plates are stripped from the flattened plastic ring.

A ring of thermoplastic, such as I have described, lends itself admirably for use as a trim ring on an automobile wheel. By the use of my method above described, it is possible to produce such a trim ring as economically from synthetic plastic as it is to produce it from steel sheet.

I claim as my invention:

1. In an apparatus for forming plastic articles, a plastic extruder having a plurality of relatively swingable extruding nozzles with their discharge ends movable away and toward each other, means for reciprocating said nozzles, a support for receiving the plastic as it is extruded from said nozzles and means for moving said support at right angles to the movement of said nozzles so that the plastic deposited on said support is in ring-like form.

2. In an apparatus for forming plastic rings, a plastic extruder having a plurality of relatively swingable extruding nozzles with their discharge ends movable away and toward each other, means for reciprocating said nozzles, a support for receiving the plastic as it is extruded from said nozzles and means for moving said support at right angles to the movement of said nozzles so that the plastic deposited on said support is in ring-like form, each of said nozzles comprising a tube swivelly mounted in the extruder and having its other end cut on a bias opposite the companion nozzle, the line of cut being such that when said nozzles come together their free ends lap each other to cut off the flow of plastic.

3. In an apparatus for forming plastic rings, a plastic extruder having a plurality of relatively swingable extruding nozzles with their discharge ends movable away and toward each other, means for reciprocating said nozzles, a support for receiving the plastic as it is extruded from said nozzles and means for moving said support at right angles to the movement of said nozzles so that the plastic deposited on said support is in ring-like form, said support including a polished plate and having hingedly connected thereto a second polished plate adapted to be swung over and onto a deposited ring of plastic for subsequently flattening the plastic into sheet-like form.

4. In an apparatus for forming plastic rings, a plastic extruder having a plurality of relatively swingable extruding nozzles with their discharge ends movable away and toward each other, means for reciprocating said nozzles, a support for receiving the plastic as it is extruded from said nozzles, means for moving said support at right angles to the movement of said nozzles so that the plastic deposited on said support is in ring-like form, means for heating the plastic in the extruder and a heating chamber enveloping the discharge stream and said support to maintain the plastic hot as it is being deposited in ring-like form.

5. In an apparatus for forming plastic rings, a plastic extruder having a plurality of relatively swingable extruding nozzles with their discharge ends movable away and toward each other, means for reciprocating said nozzles, a support for receiving the plastic as it is extruded from said nozzles, means for moving said support at right angles to the movement of said nozzles so that the plastic deposited on said support is in ring-like form, said support comprising a polished plate and said means for moving the support comprising an endless conveyor movable past the extruder and toward a plastic pressing zone.

6. In apparatus for forming plastic material, means for extruding plastic material including a pair of nozzles mounted for relative movement, means for moving said nozzles relatively toward and away from one another, and means for receiving a stream of plastic from each of said nozzles, said last mentioned means and said nozzle moving means being correlated for relative movement in the movement of the nozzles relative to each other whereby the streams of plastic material from the nozzles are deposited on said receiving means in end to end relation in a closed geometric pattern.

7. The method of forming a geometric plastic pattern which comprises depositing a pair of limited length streams of plastic material upon a support while the streams and the support are in relative movement, and joining both the starting and terminal ends of the streams in end to end relation to form the geometric pattern.

8. The method of forming a plastic circle which comprises depositing a pair of semi-circular plastic streams upon a support, and joining the respective opposite ends of the streams to complete the circle.

9. The method of forming a circular plastic blank which comprises simultaneously forming a pair of semi-circular streams of the plastic, and coincident with the starting and termination of the streams joining the respective starting and terminal ends thereof.

10. In a method of forming plastic articles, the steps of discharging two limited length streams of plastic toward a support and with the starting ends of the streams joined together, advancing said support under said streams and simultaneously moving said streams away from and then toward each other transversely to the direction of advance of the support, until the streams merge at their terminal ends so that the plastic streams are joined together end to end to form a geometric pattern on the support.

11. In a method of forming thermoplastic material into a geometric pattern, the steps of discharging two streams of the thermoplastic material onto a support in a heated area and with the starting ends of the streams joined together, advancing said support through said heated area as the formation of the streams progresses, and concurrently moving said streams away from and then toward each other transversely of the direction of advance of the support until the streams again come together in the predetermined geometric pattern, and then discontinuing the streams.

12. In a method of forming thermoplastic material into a geometric pattern, the steps of discharging two streams of the thermoplastic material onto a support in a heated area and with the starting ends of the streams joined together, advancing said support through said heated area as the formation of the streams progresses, concurrently moving said streams away from and then toward each other transversely of the direction of advance of the support until the streams again come together in the predetermined geometric pattern, then discontinuing the streams, and squeezing the geometric thermoplastic pattern, while hot, between polished surfaces to flatten the same into a relatively thin sheet-like form.

13. In apparatus for forming plastic material, means for extruding plastic material including a pair of nozzles mounted for relative movement, means for moving said nozzles relatively toward and away from one another, and means for receiving the respective streams of plastic from the nozzles, said last mentioned means and said nozzle moving means being correlated for relative movement of the receiving means and the nozzles while the nozzles are in said movement relative to each other, said nozzles being cooperatively constructed and related to cut off the streams of plastic after the formation of a predetermined pattern as a result of said relative movements.

14. In apparatus for forming plastic material, a pair of nozzles mounted for relative movement, and adapted to have plastic material issue therefrom in stream form, and means for moving said nozzles toward and away from one another so that the streams issuing therefrom will be deposited upon an underlying surface in a predetermined geometric pattern, the ends of the nozzles being correlated for mutual nozzle closing action in the closest approach of the nozzles toward one another.

15. In apparatus for forming plastic material, a pair of pendant swingably mounted nozzles from which respective streams of plastic material are adapted to issue, and a system of actuating cams operable to swing the nozzles relatively.

GEORGE ALBERT LYON.

REFERENCES CITED

The following references are of record in the file of this patent:

UNITED STATES PATENTS

| Number | Name | Date |
| --- | --- | --- |
| 1,730,673 | Mell | Oct. 8, 1929 |
| 2,918,127 | Pfeiffer | July 11, 1933 |